(12) United States Patent
Shiomi et al.

(10) Patent No.: US 9,261,259 B2
(45) Date of Patent: Feb. 16, 2016

(54) LASER-BEAM UTILIZATION DEVICE AND VEHICLE HEADLIGHT

(75) Inventors: Takeshi Shiomi, Osaka (JP); Masaru Nomura, Osaka (JP); Yoshiji Ohta, Osaka (JP); Hiroshi Iwata, Osaka (JP); Koji Takahashi, Osaka (JP); Katsuhiko Kishimoto, Osaka (JP)

(73) Assignee: SHARP KABUSHIKI KAISHA, Osaka-Shi (JP)

( * ) Notice: Subject to any disclaimer, the term of this patent is extended or adjusted under 35 U.S.C. 154(b) by 135 days.

(21) Appl. No.: 14/127,127

(22) PCT Filed: May 25, 2012

(86) PCT No.: PCT/JP2012/063560
§ 371 (c)(1),
(2), (4) Date: Dec. 17, 2013

(87) PCT Pub. No.: WO2013/001953
PCT Pub. Date: Jan. 3, 2013

(65) Prior Publication Data
US 2014/0168940 A1   Jun. 19, 2014

(30) Foreign Application Priority Data

Jun. 30, 2011   (JP) .................................. 2011-146535

(51) Int. Cl.
*B60Q 1/00* (2006.01)
*F21V 9/08* (2006.01)
*F21S 8/10* (2006.01)
*F21V 7/22* (2006.01)
*F21V 9/16* (2006.01)
*F21Y 101/02* (2006.01)

(52) U.S. Cl.
CPC ................ *F21V 9/08* (2013.01); *B60Q 1/0023* (2013.01); *F21S 48/115* (2013.01); *F21S 48/1225* (2013.01); *F21V 7/22* (2013.01); *F21V 9/16* (2013.01); *F21Y 2101/025* (2013.01)

(58) Field of Classification Search
CPC ....... F21Y 2101/025; F21V 9/08; F21V 7/22; F21V 9/16; F21S 48/1225; B60Q 1/0023
USPC .................................................. 362/511, 553
See application file for complete search history.

(56) References Cited

U.S. PATENT DOCUMENTS 6,439,751 B1 *   8/2002   Jones et al. .................... 362/470
7,588,351 B2 *   9/2009   Meyer ........................... 362/294

(Continued)

FOREIGN PATENT DOCUMENTS

JP   2008-73346   4/2008
JP   2010-20163   1/2010

(Continued)

OTHER PUBLICATIONS

International Search Report mailed Sep. 4, 2012, directed to International Application No. PCT/JP2012/063560; 1 page.

*Primary Examiner* — Anabel Ton
(74) *Attorney, Agent, or Firm* — Morrison & Foerster LLP

(57) ABSTRACT

A headlamp (1) that utilizes a laser beam includes a scattered-light emitting unit (21) that emits scattered light upon receipt of a laser beam deviated from a predetermined path through which the laser beam is to pass or a predetermined irradiation region that is to be irradiated by the laser beam.

12 Claims, 9 Drawing Sheets

(56) References Cited

U.S. PATENT DOCUMENTS

| | | | |
|---|---|---|---|
| 7,682,057 B2* | 3/2010 | Albou | 362/507 |
| 8,400,011 B2* | 3/2013 | Kawaguchi et al. | 307/9.1 |
| 2004/0137265 A1 | 7/2004 | Shimada et al. | |
| 2008/0232127 A1* | 9/2008 | Futami | 362/511 |
| 2010/0007855 A1 | 1/2010 | Murata | |
| 2011/0044070 A1 | 2/2011 | Takahashi | |
| 2011/0084609 A1 | 4/2011 | Kawaguchi et al. | |
| 2011/0280033 A1* | 11/2011 | Kishimoto et al. | 362/543 |
| 2012/0069593 A1* | 3/2012 | Kishimoto et al. | 362/511 |
| 2013/0194816 A1* | 8/2013 | Hager et al. | 362/487 |

FOREIGN PATENT DOCUMENTS

| | | |
|---|---|---|
| JP | 2011-86432 | 4/2011 |
| WO | WO-02/091487 | 11/2002 |

* cited by examiner

FIG. 8
(a)
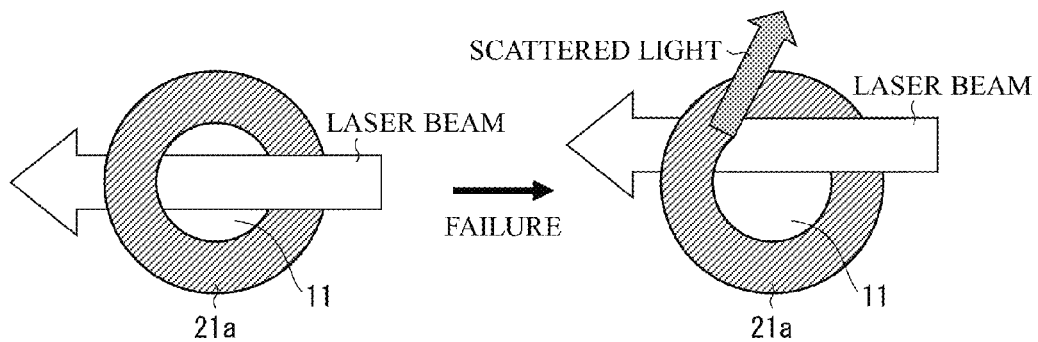
(b)
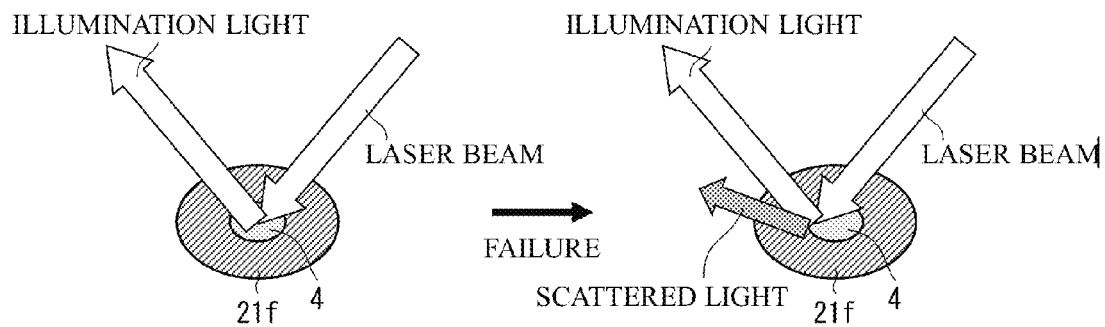

LASER-BEAM UTILIZATION DEVICE AND VEHICLE HEADLIGHT

REFERENCE TO RELATED APPLICATIONS

This application is a national stage application under 35 USC 371 of International Application No. PCT/JP2012/063560, filed May 25, 2012, which claims the priority of Japanese Patent Application No. 2011-146535, filed Jun. 30, 2011, the entire contents of which are incorporated herein by reference.

FIELD OF THE INVENTION

The present invention relates to devices such as a laser-beam utilization device that utilizes laser beams.

BACKGROUND OF THE INVENTION

To date, illuminating devices formed by combining a fluorescent member and a semiconductor light-emitting element, such as a light-emitting diode element or a semiconductor laser device, that emits light used as an excitation light have been known. Light-emitting diode elements or semiconductor laser devices used as excitation light sources often include a nitride semiconductor that emits light in a spectrum ranging from ultraviolet to blue. Thus, a material that can convert light in the corresponding wave range to green to red light is selected as a fluorescent member. Consequently, an illuminating device that emits light of a desired color can be formed. Such an illuminating device is disclosed in, for example, PTL 1.

Here, when the intensity of light emitted from the semiconductor light-emitting elements reaches or exceeds a specific intensity, such light becomes hazardous to the human body. Particularly, since laser beams emitted from semiconductor laser devices are coherent light, when directly impinging on the human eye, laser beams have an extremely high power density and thus are highly likely to damage eyes.

On the other hand, even if the above-described illuminating devices include semiconductor laser devices as light sources, laser beams can be safely directed at the human eye as long as they are emitted to fluorescent members because laser beams scattered by the fluorescent members are no longer coherent light. Thus, some have proposed using semiconductor laser devices as light sources (excitation light sources) instead of existing light sources such as incandescent light bulbs.

For example, PTL 2 describes an electronic endoscope device including a semiconductor laser as a light source of illumination light that illuminates an object in a lumen. This electronic endoscope device includes an endoscope insertable portion and a device body connected to the endoscope insertable portion. On the device body, a semiconductor laser device (laser chip) is mounted as a light source. Laser beams oscillated by the semiconductor laser device are transmitted through a communication fiber installed in the endoscope insertable portion and emitted to a fluorescent filter (fluorescent member) disposed at the tip of the endoscope insertable portion. The fluorescent filter emits white light when irradiated with laser beams, whereby the object is illuminated. In addition, an imaging unit including an image sensor is disposed at the tip of the endoscope insertable portion. This imaging unit is driven by a signal processor installed in the device body and imaging signals from the imaging unit are signal-processed so that an endoscopic image is displayed on a monitor.

When such an electronic endoscope device has received damage, such as breakage of the communication fiber, laser beams may leak out of the endoscope insertable portion. In view of this, PTL 2 discloses an illumination system in which laser beams do not leak out of an endoscope insertable portion even in the case of occurrence of damage. Specifically, the system electrically senses breakage or a short circuit of a cable that connects a signal processor and an imaging unit. When the system detects breakage or a short circuit of the cable, the system controls laser beam output such that laser beams do not leak out of the endoscope insertable portion.

In addition, PTL 3 discloses an illuminating device that includes a reflected-light detecting unit that detects a specific wavelength of light reflected off a fluorescent member for improvement of eye safety.

PATENT LITERATURE

PTL 1: Japanese Unexamined Patent Application Publication "International Publication No. 2002/091487 (published on Nov. 14, 2002)"

PTL 2: Japanese Unexamined Patent Application Publication "Japanese Unexamined Patent Application Publication No. 2008-73346 (published on Apr. 3, 2008)"

PTL 3: Japanese Unexamined Patent Application Publication "Japanese Unexamined Patent Application Publication No. 2011-86432 (published on Apr. 28, 2011)"

SUMMARY OF INVENTION

It is, however, very difficult to use the illumination system according to PTL 2 in devices other than endoscope devices. Even if the system can be used in devices other than endoscope devices, disadvantageously, the configuration becomes complex. Thus, when the system is used in devices other than endoscope devices, such as general lights, the size reduction of such devices is difficult, which is a disadvantage.

Moreover, in the case where a failure that does not involve breakage or short-circuit of a cable occurs, the above-described illumination system cannot detect a laser beam that has leaked out of an endoscope insertable portion. In other words, when the above-described illuminating device is used in general lights and the like, emitted laser beams may directly impinge on the human eye. Occurrence of such a trouble would thus pose a problem in terms of the safety of the human eye.

In addition, the illuminating device according to PTL 3 detects light emitted from a light source and having a specific wavelength, that is, a laser beam itself. The illuminating device neither converts the laser beam into scattered light nor detects the scattered light to improve eye safety.

The present invention was made to solve the above problems. An object of the present invention is to provide a laser-beam emitting device and a vehicle headlight that can reduce the degree of danger in using laser beams.

In order to solve the above problems, a laser-beam utilization device according to an embodiment of the present invention is a laser-beam utilization device that utilizes laser beams, the device including a scattered-light emitting unit that emits scattered light upon receipt of a laser beam deviated from a predetermined path through which the laser beam is to pass or a predetermined irradiation region that is to be irradiated by the laser beam.

In the above configuration, when a laser beam is deviated from the predetermined path or the predetermined irradiation region, the scattered-light emitting unit emits scattered light upon receipt of the laser beam. Since the laser beam is converted into scattered light and the scattered light is then emitted, the degree of danger in using laser beams can be reduced.

As described above, the laser-beam utilization device according to an embodiment of the present invention includes a scattered-light emitting unit that emits scattered light upon receipt of a laser beam deviated from a predetermined path through which the laser beam is to pass or a predetermined irradiation region that is to be irradiated by the laser beam.

Thus, the laser-beam utilization device according to an embodiment of the present invention is effective at reducing the degree of danger in using laser beams.

BRIEF DESCRIPTION OF DRAWINGS

FIG. 8 Part (a) illustrates a change of a laser-beam path due to a trouble at a portion of a predetermined path while part (b) illustrates a change of a laser-beam path due to a trouble at a predetermined irradiation region (at the end of the predetermined path).

DETAILED DESCRIPTION OF THE INVENTION

First Embodiment

An embodiment of the present invention will be described with reference to FIG. 1 to FIG. 12 below. Here, an automotive headlamp (a laser-beam utilization device or a vehicle headlight) 1 is described as an example of an illuminating device including a laser-beam utilization device according to an embodiment of the present invention. Note that a laser-beam utilization device according to an embodiment of the present invention may be formed as a headlamp of vehicles or movable bodies other than automobiles (such as human beings, vessels, aircraft, submarines, or spacecraft) or as an illuminating device for other purposes. Examples of an illuminating device for other purposes include searchlights, projectors, and household illuminators. An example of household illuminators is a downlight. A downlight is an illuminating device placed on the ceiling of a structure such as a house or a vehicle.

The headlamp 1 may satisfy the regulations of luminous intensity distribution for a driving beam (high beam) or the regulations of luminous intensity distribution for a passing beam (low beam).

<Configuration of Headlamp 1>

Figure 1:
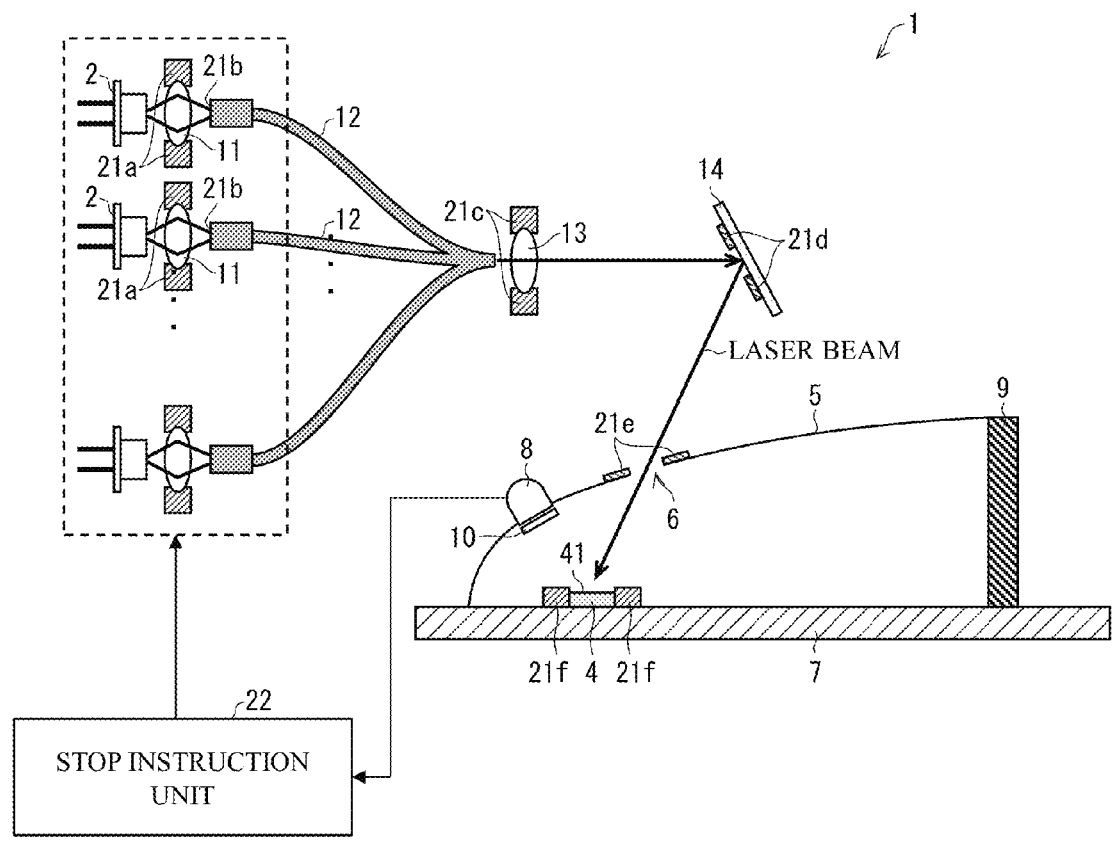
FIG. 1 illustrates a schematic configuration of a headlamp according to an embodiment of the present invention in a cross section.

FIG. 1 illustrates a schematic configuration of a headlamp 1 according to an embodiment of the present invention in a cross section. As illustrated in FIG. 1, the headlamp 1 includes laser devices 2 (light sources), condensing lenses 11 (light transmitting members), optical fibers 12 (light transmitting members), a lens 13 (light transmitting member) a reflection mirror 14 (light reflecting member), a light emitting unit 4, a half parabola reflector 5, a metal base 7, a photosensor 8 (detection means), a light-blocking filter 9 (outdoor-light blocking means), scattered-light emitting units 21a to 21f, and a stop instruction unit 22 (stop instruction means). In some cases, the scattered-light emitting units 21a to 21f may be collectively referred to as "scattered-light emitting units 21".

As illustrated in FIG. 1, in the headlamp 1, laser beams from the laser devices 2 are emitted to a light receiving surface 41 (predetermined irradiation region) of the light emitting unit 4 through the condensing lenses 11, the optical fibers 12, the lens 13, the reflection mirror 14, and a window portion 6 of the half parabola reflector 5. In this embodiment, an optical path through which the laser beams pass until being emitted to the light receiving surface 41 of the light emitting unit 4, that is, a path through which laser beams are to pass as designed in accordance with an optical design of the headlamp 1, is referred to as a predetermined path.

The scattered-light emitting unit 21 forms a basic configuration of a laser-beam utilization device. In other words, it can be said that the headlamp 1 includes this laser-beam utilization device.

(Laser Device 2)

The laser devices 2 are light-emitting elements that function as excitation light sources that emit excitation light. In FIG. 1, multiple laser devices 2 are provided and laser beams are oscillated from the multiple laser devices 2 as excitation light. Although use of only one laser device 2 may be acceptable, use of multiple laser devices 2 makes it easier to produce high-power laser beams.

Each laser device 2 is, for example, a device that includes one emitting point (one stripe) per chip and whose light output is 1.0 W, whose operation voltage is 5 V, and whose current is 0.7 A. The device is encapsulated in a package (stem) having a diameter of 5.6 mm. In this embodiment, ten laser devices 2 are used and thus the sum of the light output is 10 W.

In addition, each laser device 2 is, for example, a blue-violet semiconductor laser that oscillates beams of a wavelength of 405 nm. Such a blue-violet semiconductor laser is made of $Al_xGa_yIn_zN$ ($x+y+z=1$ where $0 \leq x \leq 1$, $0 \leq y \leq 1$, and $0 \leq z \leq 1$) based nitride. Each laser device 2 can change the oscillation wavelength in a range from the ultraviolet region to the red region by changing materials or compositions of an active layer that emits light.

(Condensing Lens 11)

The condensing lenses 11 are lenses that cause the laser beams oscillated from the laser devices 2 to enter incident end portions of the optical fibers 12, which are first end portions. Sets each including one laser device 2 and one condensing lens 11 are in one-to-one correspondence with multiple optical fiber 12. In other words, each laser device 2 is optically connected to the corresponding optical fiber 12 via the corresponding condensing lens 11, which is disposed at a portion of the predetermined path of the laser beam. Each condensing lens 11 has, for example, a diameter of 5 mm.

Each condensing lens 11 should preferably have a laser-beam transmissivity of 90% or higher so that a laser beam can efficiently form its path.

(Optical Fiber 12)

The optical fibers 12 are light guide members that guide laser beams oscillated by the laser devices 2 to the light emitting unit 4. Specifically, the optical fibers 12 are placed at some portions of the predetermined laser-beam path. Each optical fiber 12 has a two-layer structure formed by covering a center core with a cladding having a lower refractive index than the core. A laser beam that enters from an incident end portion passes through the optical fiber 12 and emerges from an emergence end portion of the optical fiber 12, which is a second end portion. The emergence end portions of the optical fibers 12 are tied up in a bundle with a ferrule or the like. In this embodiment, optical fibers 12 having a core diameter of 125 μm are used as examples.

(Lens 13)

The lens 13 is used to direct the laser beams emitted from the emergence end portions of the optical fibers 12 to the light emitting unit 4. Specifically, the lens 13 is placed at a portion of the predetermined laser-beam path. The lens 13 also magnifies the laser beams such that the entire light receiving surface 41 of the light emitting unit 4, which is a top surface, is irradiated with the laser beams. Thus, the efficiency with which the laser beams are converted into fluorescence (efficiency of laser beam use) can be increased. The lens 13 has, for example, a diameter of 5 mm.

For the same reason as in the case of the condensing lens 11, the lens 13 should preferably have a laser-beam transmissivity of 90% or higher.

(Reflection Mirror 14)

The reflection mirror 14 reflects the laser beam emitted from the lens 13 and changes the path of the laser beam so as to guide the laser beam to the light emitting unit 4 through the window portion 6 of the half parabola reflector 5. Specifically, the reflection mirror 14 is placed at a portion of the predetermined laser beam path. This configuration allows the laser beam path to be freely and appropriately changed and thus can increase the degree of design freedom of the headlamp 1.

The reflection mirror 14 should preferably have a laser-beam reflectivity of 90% or higher so that the laser beam can efficiently form its path.

When the transmissivity of the transmitting members or the reflectivity of the reflecting member is 90% or higher, the transmitting members or the reflecting member can efficiently transmit laser beams. Consequently, the amount of light that is produced when a laser beam is absorbed by the transmitting members and the reflecting member (such as infrared light) can be reduced. In addition, the amount of light that is produced by being unintentionally reflected by the transmitting members and the reflecting member (such as irregular reflection or surface reflection caused by impurities or surface roughness) can be reduced. Thus, noises that occur in the detection means such as the photosensor 8 can be reduced, whereby the detection means can more easily detect scattered light.

(Light Emitting Unit 4)

The light emitting unit 4 emits fluorescence upon receipt of the laser beam emitted from the laser device 2 and includes fluorescent members (fluorescent substances) that emit light upon receipt of the laser beam.

Specifically, the light emitting unit 4 is formed by dispersing fluorescent substances into a sealant or by compacting fluorescent substances. It can be said that the light emitting unit 4 is a wavelength conversion element because the light emitting unit 4 converts laser beams into fluorescence. Since the light emitting unit 4 converts laser beams into fluorescence and emits fluorescence as illumination light, the laser-beam utilization device according to an embodiment of the present invention can be utilized as a light source that emits light having an appropriate wavelength (headlamp 1 in this embodiment).

The light emitting unit 4 is placed on the metal base 7 at or around a focusing position of the half parabola reflector 5, that is, in a predetermined irradiation region of a laser beam. In this embodiment, the light emitting unit 4 is formed by performing coating on the metal base 7. With this positioning, fluorescence emitted from the light emitting unit 4 is reflected by a reflective curved surface of the half parabola reflector 5 so that its optical path is controlled. In other words, it can be said that the light emitting unit 4 according to this embodiment is a reflective light emitting unit that emits fluorescence to the laser-beam incident surface (light receiving surface 41) side. Here, the light receiving surface 41 may have an antireflective configuration that prevents reflection of laser beams.

Here, a reflective light emitting unit means a light emitting unit that emits light to the side on which laser beams are incident.

The color of the illumination light of a headlamp is restricted to white having a predetermined range of chromaticity by law. Thus, the light emitting unit 4 includes fluorescent substances selected such that the illumination light becomes white.

For example, blue, green, and red fluorescent substances are added to the light emitting unit 4. When laser beams of 405 nm are emitted to the light emitting unit 4, white light is emitted from the light emitting unit 4. Here, examples of selected fluorescent substances are those that respectively emit blue (wavelength of 440 nm to 480 nm), green (wavelength of 500 nm to 540 nm), and red (wavelength of 610 nm to 650 nm) light by absorbing laser beams having a wavelength of 405 nm and emitted from the laser devices 2. These fluorescent substances (the blue fluorescent substances, the green fluorescent substances, and the red fluorescent substances) are blended and dispersed into the light emitting unit 4.

White light can be also produced by emitting (blue) laser beams of 450 nm (or so-called laser beams neighboring blue having a peak wavelength in the range from 440 nm to 490 nm) to the light emitting unit 4 into which yellow (having a wavelength of 540 nm to 580 nm) fluorescent substances (or green and red fluorescent substances) are added. Other conceivable examples include a combination of the blue fluorescent substances and the yellow fluorescent substances and a combination of a blue-green (wavelength of 470 nm to 520 nm) fluorescent substances and the red fluorescent substances. When light of a color other than white light is emitted as illumination light, a desired color can be produced by selecting appropriate fluorescent substances.

Examples of the fluorescent substances of the light emitting unit 4 include oxynitride-based fluorescent substances (such as SiAlON phosphors) and III-V compound semiconductor nanoparticle fluorescent substances (such as indium phosphide, InP). These fluorescent substances are highly thermotolerant of high power (and/or flux density) laser beams emitted from the laser devices 2 and thus are most suitable for laser illumination light sources. The fluorescent substances in the light emitting unit 4, however, are not limited to the above-described examples and may be other fluorescent substances such as nitride phosphors.

More specifically, examples of the blue fluorescent substances include a Ce-doped JEM phosphor, a Ce-doped La-n phosphor, and a Eu-doped AlN phosphor. Examples of the green fluorescent substances include a Eu-doped β-SiAlON phosphor, a Ce-doped (Sr, Ca)AlSiN$_3$ phosphor, a Ce-doped Sr$_2$Si$_5$N$_8$ phosphor, and a Yb-doped α-SiAlON phosphor. Examples of the yellow fluorescent substances include a Eu-doped α-SiAlON phosphor, a YAG (yttrium aluminum garnet) phosphor, and a Ce-doped CaAlSiN$_3$ phosphor. Examples of the red fluorescent substances include a Mn-doped 0.5MgF$_2$.3.5MgO.GeO$_2$ phosphor, a Eu-doped (Sr, Ca)AlSiN$_3$ phosphor, a Eu-doped CaAlSiN$_3$ phosphor, and a Eu-doped Sr$_2$Si$_5$N$_8$ phosphor. Moreover, examples of the blue-green fluorescent substances include a Eu-doped (Ba, Sr)$_2$Si$_2$O$_2$N$_2$ phosphor.

The sealant of the light emitting unit 4 is made of, for example, a glass material (inorganic glass or organic/inorganic hybrid glass) or a resin material such as silicone resin. The glass material may be a low-melting glass. A highly transparent sealant is preferable. Moreover, a heat-resistant sealant is suitable for high-power laser beams.

The light emitting unit 4 also includes a light receiving surface 41 irradiated with a laser beam that enters through the window portion 6 of the half parabola reflector 5. The light emitting unit 4 has a substantially cylindrical shape having, for example, a diameter of 2 mm at the light receiving surface 41 and a height (thickness) of 0.2 mm. In other words, the light receiving surface 41 is substantially circular. The diameter and the height of the light emitting unit 4 should preferably be determined on the basis of the efficiency of fluorescence use, a predetermined amount of light, and radiation efficiency.

(Half Parabola Reflector 5)

The half parabola reflector 5 reflects fluorescence produced by the light emitting unit 4 and forms a bundle of rays (illumination light) that travel within a predetermined solid angle. The half parabola reflector 5 may be, for example, a member having a metal thin layer on the surface or may be a member made of metal.

The reflection surface of the half parabola reflector 5 has at least part of a partial curved surface formed by cutting a curved surface (parabolically curved surface), formed by rotating a parabola around a symmetry axis of the parabola, with a plane including the rotation axis. When the half parabola reflector 5 is viewed from the front, an opening of the half parabola reflector 5 (an exit of illumination light) is semicircular. In this embodiment, the opening is a semicircle having a radius of 30 mm.

The laser devices 2 are disposed outside the half parabola reflector 5. The half parabola reflector 5 has a window portion 6 that transmits laser beams or allows laser beams to pass therethrough. Specifically, the half parabola reflector 5 is disposed in the headlamp 1 such that the window portion 6 of the half parabola reflector 5 is positioned at some portion of the predetermined laser beam path. The window portion 6 may be an opening or may include a transparent member that can transmit laser beams. For example, a transparent plate that transmits laser beams and has a filter that reflects white light (fluorescence of the light emitting unit 4) may be disposed in the window portion 6. This configuration can prevent fluorescence emitted from the light emitting unit 4 from leaking from the window portion 6.

Instead of the transparent plate, a filter (or outdoor-light blocking means) may be included that transmits laser beams and prevents outdoor light having a wavelength equal to or close to the wavelength of fluorescence emitted from the scattered-light emitting unit 21 (predetermined wavelength) from entering a detectable range of the photosensor 8. This configuration can prevent the photosensor 8 from malfunctioning due to an entrance of outdoor light through the window portion 6.

The half parabola reflector 5 may partially include a portion that is not a parabola. A reflection mirror that emits fluorescence emitted from the light emitting unit 4 through an opening as illumination light is not limited to the half parabola reflector 5 and may be an ellipsoid reflector or a hemispherical reflector. In other words, a reflection mirror may be any object that includes, on the reflection surface, at least part of a curved surface formed by rotating a shape (ellipse, circle, or parabola) around the rotation axis. Considering the efficiency of fluorescence use, however, it is preferable not to use a parabola reflector as a reflection mirror, as will be described below.

The depth of the half parabola reflector 5 is, for example, 80 mm. For the purpose of evenly irradiating the entire illumination light spot, the depth should preferably be substantially equal to the radius of a circle or semicircle included in the shape of the opening of the half parabola reflector 5. Here, the depth of the half parabola reflector 5 is a distance from the plane including the opening of the half parabola reflector 5 (plane on which the light-blocking filter 9 is disposed) to the tip of the half parabola reflector 5. In other words, the depth of the half parabola reflector 5 is the longest one of lengths of perpendiculars from the plane including the opening of the half parabola reflector 5 to the reflective curved surface.

Since the illuminance distribution of the illumination light spot changes in accordance with the purpose of use of emitting devices, the illuminance distribution of the illumination light spot may be made adjustable by making the depth of the half parabola reflector 5 adjustable so as to meet the purpose of use.

(Metal Base 7)

The metal base 7 is a plate-shaped support member that supports the light emitting unit 4 and is made of metal (such as copper or iron). Thus, the metal base 7 has high thermal conductivity and can efficiently emit heat produced by the light emitting unit 4. In this embodiment, the metal base 7 is made of copper and aluminum is deposited on the surface of the metal base 7 on which the light emitting unit 4 is disposed. Alternatively, the metal base 7 may be formed by a copper plate subjected to silver plating.

A member that supports the light emitting unit 4 is not limited to those made of metal and may be those containing highly thermal conductive materials (such as glass or sapphire) other than metal. However, the surface of the metal base 7 that is in contact with the light emitting unit 4 should preferably function as a reflection surface. When the surface is a reflection surface, the laser beams incident on the top surface of the light emitting unit 4 are converted into fluorescence and the fluorescence is then reflected by the reflection surface to be directed toward the half parabola reflector 5. Alternatively, the laser beams incident on the top surface of the light emitting unit 4 can be reflected by the reflection surface so as to be directed into the light emitting unit 4 again and converted into fluorescence.

Since the metal base 7 is covered with the half parabola reflector 5, it can be said that the metal base 7 has a surface facing the reflective curved surface (parabolically curved surface) of the half parabola reflector 5. The surface of the metal base 7 on which the light emitting unit 4 is disposed should preferably be substantially parallel to the rotation axis of a rotation paraboloid of the half parabola reflector 5 and should preferably include a large part of the rotation axis.

(Photosensor 8)

The photosensor 8 detects scattered light emitted by the scattered-light emitting unit 21. By installing the photosensor 8, scattered light emitted by the scattered-light emitting unit 21 when laser beams are deviated from the predetermined path or irradiation region can be detected inside the headlamp 1. In addition, the photosensor 8 is connected to the stop instruction unit 22. When the photosensor 8 has detected scattered light, the photosensor 8 transmits the event (detection confirmation signal) to the stop instruction unit 22.

When a laser beam is deviated from the predetermined path or irradiation region (when the headlamp 1 is broken) due to a cause such as an impact made on the headlamp 1, the laser beam impinges on the scattered-light emitting unit 21 disposed adjacent to the predetermined path or irradiation region and is converted into the scattered light. The photosensor 8 is provided for detecting scattered light emitted from the scattered-light emitting unit 21, that is, for detecting deviation of a laser beam from the predetermined path or irradiation region. As will be described below, the detection of the photosensor 8 triggers the stop instruction unit 22 so that the stop instruction unit 22 causes the laser devices 2 to stop emitting laser beams, thereby improving the safety of the human body.

The photosensor 8 is disposed in such a range (detectable range) that scattered light emitted by the scattered-light emitting unit 21 is detectable, that is, within a predetermined solid angle formed by the scattered light. For example, as illustrated in FIG. 1, in order to detect scattered light emitted from the scattered-light emitting unit 21f, the photosensor 8 is disposed in a hole formed in a portion of the half parabola reflector 5 such that a scattered-light incident surface (detection surface) of the photosensor 8 faces the scattered-light emitting unit 21f (light emitting unit 4). Here, the photosensor 8 should preferably be disposed on a side opposite to the side of the opening of the half parabola reflector 5 with respect to the light emitting unit 4 (that is, on the tip side of the half parabola reflector 5). In this case, fluorescence emitted from the light emitting unit 4 and directed toward the opening of the half parabola reflector 5 impinges on the photosensor 8, whereby the efficiency of fluorescence use is prevented from being reduced.

Although FIG. 1 illustrates only the photosensor 8 that detects scattered light emitted from the scattered-light emitting unit 21f as an example, photosensors 8 corresponding to the scattered-light emitting units 21a to 21e are disposed near these scattered-light emitting units 21. These photosensors 8 are disposed in such ranges as to be capable of detecting scattered light emitted from these scattered-light emitting units 21a to 21e.

In this embodiment, when the scattered-light emitting units 21 are irradiated with laser beams, the scattered-light emitting units 21 convert the laser beams into infrared light and emit the infrared light (having a wavelength of around 750 nm) as scattered light. In this case, a photosensor highly sensitive to infrared light such as S2386-18k from Hamamatsu Photonics is used as an example of the photosensors 8. The diameter of the scattered-light incident surface of the photosensor 8 is approximately 4.7 mm.

Figure 2:
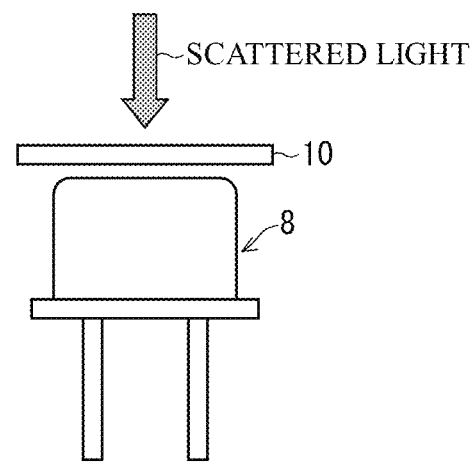
FIG. 2 illustrates a schematic configuration of a photosensor included in the headlamp in a cross section.

As illustrated in FIG. 2, a transmission filter 10 is attached to each photosensor 8 so as to be in close contact with the scattered-light incident surface of the photosensor 8. The transmission filter 10 transmits scattered light but blocks light having a wavelength other than wavelengths close to the wavelength of the scattered light. Thus, the photosensors 8 can appropriately detect only the scattered light emitted from the scattered-light emitting unit 21.

When the scattered-light emitting units 21 emit infrared light as scattered light, IR-70 from Nisshin Electronic is used as an example of the transmission filters 10. IR-70 blocks light having a wavelength shorter than that of infrared light, 700 nm or shorter, and can transmit light having a wavelength longer than that. This transmission filter 10 is a circular flat plate and has a diameter of 6 mm.

(Light-Blocking Filter 9)

As illustrated in FIG. 1, a light-blocking filter 9 is disposed in the opening of the half parabola reflector 5. The light-blocking filter 9 prevents outdoor light having a wavelength equal to or close to the wavelength of scattered light emitted from the scattered-light emitting unit 21f from entering the half parabola reflector 5 (the detectable range of the photosensor 8).

When light other than the scattered light and having a wavelength equal to or close to the wavelength of scattered light enters the detectable range of the photosensor 8, the photosensor 8 erroneously identifies the light as scattered light. The photosensor 8 then transmits a detection confirmation signal to the stop instruction unit 22, whereby emission of laser beams is stopped, that is, the headlamp 1 is turned off although the laser beams are not deviated from the predetermined path or irradiation region.

By disposing the light-blocking filter 9 in the opening of the half parabola reflector 5, outdoor light having a wavelength detectable by the photosensor 8 mounted on the half parabola reflector 5 can be prevented from entering the detectable range. Consequently, almost all the outdoor light can be excluded from the detectable range when laser beams are not deviated from the predetermined path or irradiation region. Thus, the photosensor 8 can reliably detect scattered light emitted from the scattered-light emitting unit 21f when laser beams are deviated from the predetermined path or irradiation region, whereby malfunctions of the photosensor 8 due to outdoor light can be prevented.

In addition, the light-blocking filter 9 transmits fluorescence (white light) emitted from the light emitting unit 4. Thus, the light-blocking filter 9 blocks outdoor light that may cause malfunctions of the photosensor 8 and allows the fluorescence emitted from the light emitting unit 4 to be emitted from the opening as illumination light.

When infrared light is emitted from the scattered-light emitting units 21 as scattered light, IRC-65S from Koshin Kogaku is used as an example of the light-blocking filter 9. IRC-65S prevents an entrance of outdoor light having a wavelength equal to or close to the wavelength of infrared light. In addition, the light-blocking filter 9 may have any size and shape as long as it can cover the opening. In this embodiment, the light-blocking filter 9 has a semicircular shape having a diameter of 30 mm.

The photosensors 8 are provided in one-to-one correspondence with the scattered-light emitting units 21a to 21e. Thus, each of the scattered-light emitting units 21a to 21e is provided with a housing that surrounds at least a pair of one scattered-light emitting unit 21 and one photosensor 8 and that has a function of preventing entrance of the outdoor light (for example, a housing made of the same material as the light-blocking filter 9), although the housing is not illustrated. In other words, each photosensor 8 is provided with a member that defines a closed space to prevent the outdoor light from entering the detectable range of the photosensor 8. Alternatively, each photosensor 8 may be provided with a housing that has the above-described function and surrounds the entire headlamp 1. This configuration can prevent the photosensors 8 corresponding to the scattered-light emitting units 21a to 21e from malfunctioning due to outdoor light.

(Scattered-Light Emitting Unit 21)

The scattered-light emitting units 21 emit scattered light upon receipt of laser beams when the laser beams are deviated from the predetermined path or irradiation region due to causes such as an impact on the headlamp 1. In other words, the scattered-light emitting units 21 emit scattered light upon receipt of laser beams by causing diffused reflection of laser beams using the surfaces or the irregularities inside the units 21 or by converting the laser beams into fluorescence.

Consequently, when laser beams are deviated from the predetermined path or irradiation region, the laser beams are converted into scattered light and the scattered light is emitted, thereby reducing the degree of danger in using laser beams. Detection of the scattered light by the photosensors 8 enables reliable determination as to whether or not laser beams are deviated from the predetermined path or irradiation region. In addition, since the detection can bring emission of laser beams to a halt, the laser beams can be prevented from affecting the human body when leaking out of the headlamp 1. The method for forming the scattered-light emitting units 21 is similar to that of the light emitting unit 4 and the description thereof is thus omitted.

Scattered light should preferably be light that does not exist in the detectable range of the photosensors 8 while laser beams are forming the predetermined path (not deviated from the predetermined path or when the headlamp operates normally) (for example, light other than white light in the case of the scattered-light emitting unit 21f). In this case, the photosensors 8 are to detect light that does not exist when the headlamp operates normally, allowing the photosensors 8 to perform detection with high accuracy.

In order to be able to receive laser beams deviated from the predetermined path or irradiation region, the scattered-light emitting units 21 are disposed so as to be adjacent to a corresponding one of components including: (1) the condensing lenses 11 or the lens 13, (2) the incident end portions of the optical fibers 12 (connection portions of optical path components), (3) the reflection mirror 14, (4) the window portion 6 of the half parabola reflector 5, and (5) the light emitting unit 4. Specifically, in the cases where the scattered-light emitting units 21 are disposed adjacent to the corresponding components (1) to (4), the scattered-light emitting units 21 are disposed adjacent to the predetermined path. These scattered-light emitting units 21 are disposed so as to receive laser beams deviated from the predetermined path at the corresponding portions of the predetermined path. Here, laser beams can be reliably prevented from leaking out throughout the path, that is, the security against laser beams is made reliable throughout the path. On the other hand, in the case where the scattered-light emitting unit 21 is disposed adjacent to the component (5), the scattered-light emitting unit 21 is disposed near the predetermined irradiation region, which is the terminal end of the predetermined path. In this case, laser beams can be reliably prevented from leaking out at the terminal end of the path, that is, the security against laser beams is made reliable at the terminal end of the path.

Since the scattered-light emitting units 21 are adjacent to the predetermined path or irradiation region, the scattered-light emitting units 21 can emit scattered light immediately after laser beams are deviated from the predetermined path or irradiation region even by a small distance.

Referring now to FIG. 3 to FIG. 7, the scattered-light emitting units 21a to 21f disposed adjacent to the corresponding components (1) to (5) will be described below.

Figure 3:
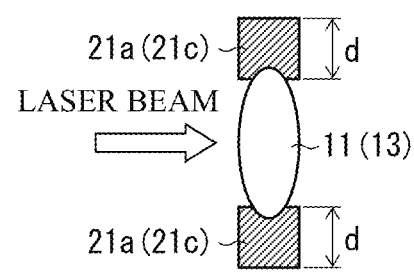
FIG. 3 illustrates a schematic configuration of a condensing lens and a lens included in the headlamp in a cross section.

FIG. 3 illustrates a schematic configuration of the condensing lens 11 and the lens 13 in a cross section in the case where the lens 11 or 13 is installed as in the case of the component (1). As illustrated in FIG. 3, the scattered-light emitting unit 21a or 21c having a doughnut shape is disposed around the condensing lens 11 or the lens 13. The dimension d of the unit 21a or 21c is, for example, 2 mm.

Figure 4:
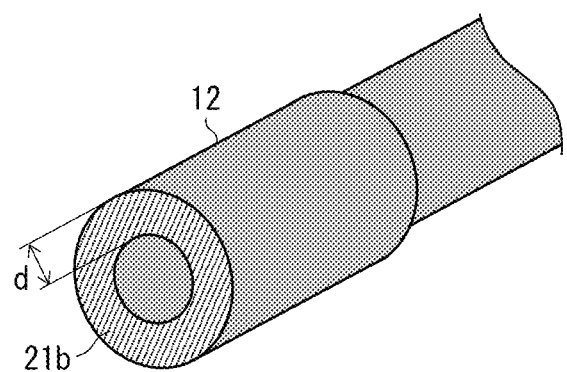
FIG. 4 is a perspective view of a schematic configuration of an incident end portion of an optical fiber included in the headlamp.

FIG. 4 is a perspective view of a schematic configuration of an incident end portion of an optical fiber 12 when the scattered-light emitting unit 21 is installed so as to be adjacent to the component (2). As illustrated in FIG. 4, the scattered-light emitting unit 21b is disposed on the surface of the incident end portion of the optical fiber 12 on the side from which laser beams enter. In the case where the scattered-light emitting unit 21b includes, for example, infrared fluorescent members, the infrared fluorescent members are formed by being coated on the surface of the incident end portion. The dimension d of the unit 21b is, for example, 2 mm.

Figure 5:
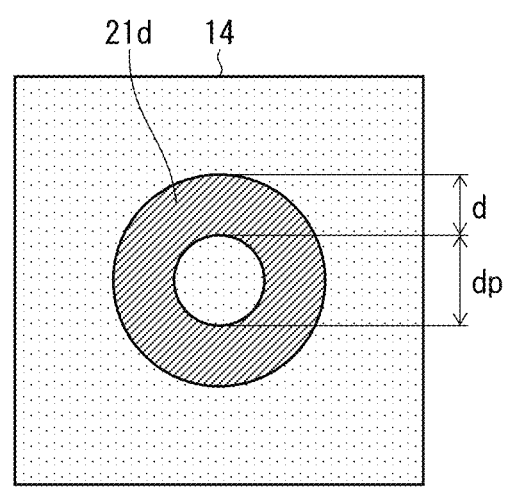
FIG. 5 is a plan view of a schematic configuration of a portion around an irradiated-by-laser-beam region of a reflection mirror included in the headlamp.

FIG. 5 is a plan view of a schematic configuration of a portion around an irradiated-by-laser-beam region of the reflection mirror 14 when the scattered-light emitting unit 21 is installed so as to be adjacent to the component (3). As illustrated in FIG. 5, the scattered-light emitting unit 21d is disposed around a center region (a region including the predetermined path) of a laser-beam reflection surface of the reflection mirror 14. For example, the scattered-light emitting unit 21d having a doughnut shape and a dimension of 2 mm (d in FIG. 5) is formed around a circle having a diameter of 3 mm (dp in FIG. 5) around the point of intersection of a center axis of the predetermined path (optical axis of a laser beam) and the laser-beam reflection surface of the reflection mirror 14. In the case where the scattered-light emitting unit 21d includes, for example, infrared fluorescent members, the infrared fluorescent members are formed by being coated on the laser-beam reflection surface.

Figure 6:
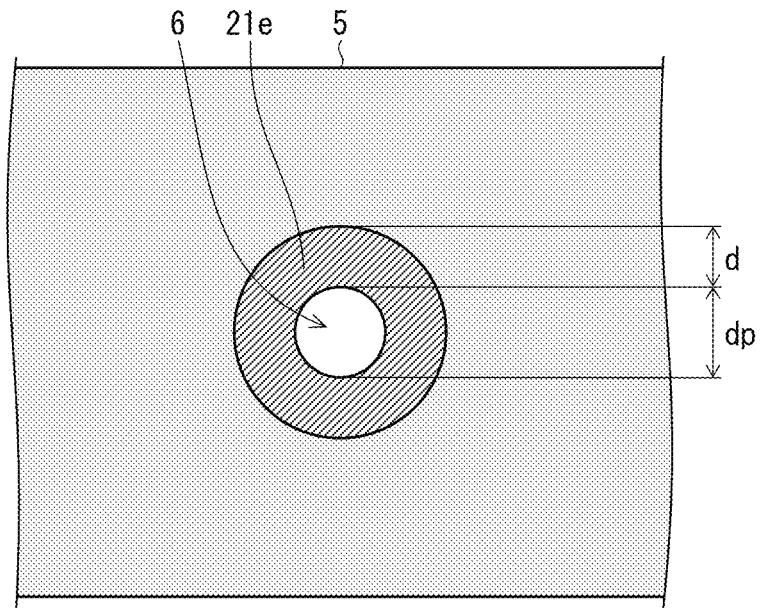
FIG. 6 is a plan view of a schematic configuration of a portion around a window portion of a half parabola reflector included in the headlamp.

FIG. 6 is a plan view of a schematic configuration of a portion around the window portion 6 of the half parabola reflector 5 when the scattered-light emitting unit 21 is installed so as to be adjacent to the component (4). As illustrated in FIG. 6, the scattered-light emitting unit 21e having a doughnut shape is disposed on the periphery of the window portion 6. When the window portion 6 is viewed from the side from which laser beams enter (on the reflection mirror 14 side), the window portion 6 has a diameter of 3 mm (dp in FIG. 6) and the dimension of the scattered-light emitting unit 21e is 2 mm (d in FIG. 6). In the case where the scattered-light emitting unit 21e includes, for example, infrared fluorescent members, the infrared fluorescent members are formed by being coated on the periphery (that is, the half parabola reflector 5).

Figure 7:
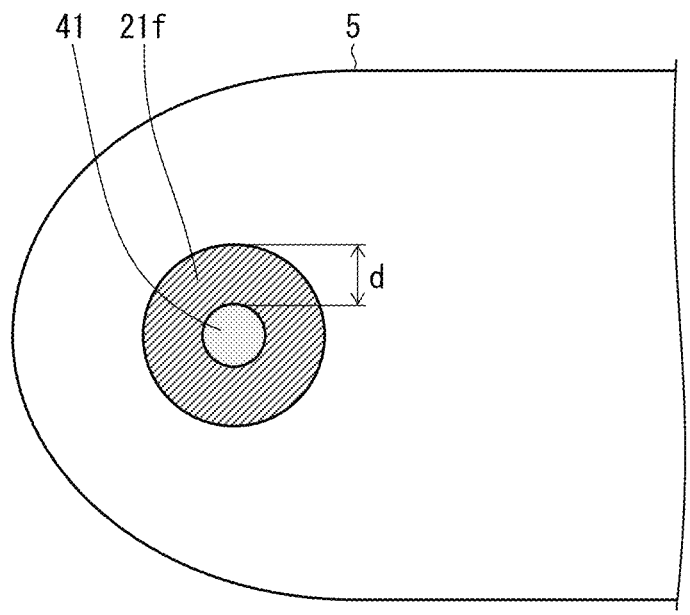
FIG. 7 is a top view of a schematic configuration of a portion around a light emitting unit included in the headlamp.

FIG. 7 is a top view of a schematic configuration of a portion around the light emitting unit 4 when the scattered-light emitting unit 21 is installed so as to be adjacent to the component (5). As illustrated in FIG. 7 as an example, the scattered-light emitting unit 21f having a doughnut shape and a dimension of 2 mm (d in FIG. 7) is disposed on the periphery of the light receiving surface 41 of the light emitting unit 4 having a diameter of 2 mm. In the case where the scattered-light emitting unit 21f includes, for example, infrared fluorescent members, the infrared fluorescent members are formed by being coated on the periphery (that is, the metal base 7).

The scattered-light emitting unit 21 around the light emitting unit 4 has a larger thickness than the light emitting unit 4 and is adjacent to the light emitting unit 4. In this manner, since the light emitting unit 4 is surrounded by the scattered-light emitting unit 21 (the scattered-light emitting unit 21 not only surrounds the side surface of the light emitting unit 4 but also covers the light emitting unit 4 from obliquely above), the fluorescent members of the light emitting unit 4 can be prevented from falling out by itself (or the light emitting unit 4 can be prevented from coming off by itself) (see FIG. 1). The difference (difference of elevation) in height (thickness) between the light emitting unit 4 and the scattered-light emitting unit 21 should preferably be at least 2.5% or larger of the diameter of the light emitting unit 4 (0.05 mm or larger when the diameter of the light emitting unit 4 is 2 mm) or more preferably 10% to 20% or larger. The difference of elevation may be appropriately adjusted within such a range that the scattered-light emitting unit 21 does not interfere with laser beams in consideration of the incident angles of the laser beams when the headlamp operates normally (such a range that the scattered-light emitting unit 21 does not prevent laser beams from being incident on the light emitting unit 4).

In the above case, the length of the scattered-light emitting unit 21 is not limited to 2 mm and may be any as long as the scattered-light emitting unit 21 can have a region that is reliably irradiated with laser beams when the laser beams are deviated from the predetermined path or irradiation region. Although the case where each scattered-light emitting unit 21 is formed so as to surround the entire periphery of the corresponding portion has been described thus far, the present invention is not limited to this case. Each scattered-light emitting unit 21 may be formed on at least part of the periphery. However, each scattered-light emitting unit 21 should preferably be formed so as to surround the entire periphery of the corresponding portion in order to securely detect laser beam leakage.

Upon receipt of laser beams, the scattered-light emitting units 21 emit, as scattered light, fluorescence having a predetermined wavelength different from the wavelength equal to or close to the wavelength of fluorescence emitted by the light emitting unit 4. In this case, since the laser beams are converted into fluorescence and the fluorescence is emitted, the degree of danger in using laser beams can be reduced. In addition, this configuration can prevent laser beams from being directly reflected off the surface of the scattered-light emitting unit 21 (laser-beam incident surface).

When scattered light emitted from the scattered-light emitting unit 21 has a wavelength different from that of fluorescence emitted from the light emitting unit 4 as a predetermined wavelength, the photosensor 8 or a user can easily detect a deviation of a laser beam.

In this embodiment, the scattered-light emitting unit 21 includes, as fluorescence, fluorescent members (infrared fluorescent members) that emit infrared light. Examples of infrared fluorescent members include $SrB_8O_{13}$:Sm and $LiAlO_2$:$Fe^{3+}$. When including any of these fluorescent members, the scattered-light emitting unit 21 can convert laser beams having a wavelength of 450 nm or shorter into infrared light having a wavelength longer than 650 nm. Since this infrared light is less likely to be used as illumination light of the headlamp 1, it can be said that the infrared light is easily detectable by the photosensor 8.

In the case where infrared fluorescent members are included in, particularly, the scattered-light emitting unit $21f$ disposed so as to be in contact with the light emitting unit 4, the following advantages can be offered as examples:

since only a small amount of infrared light is emitted at the time when the light emitting unit 4 emits white light, the photosensors 8 can perform detection with high accuracy;

an optical filter such as the light-blocking filter 9 that blocks infrared light can easily prevent infrared light (outdoor light) from entering the detectable ranges of the photosensors 8; and when fluorescence emitted from the light emitting units 4 is used as illumination light, not many design limitations are imposed by installing the optical filter because the optical filter has high transmissivity with which the illumination light (visible light) is highly likely to be transmitted through the optical filter.

Besides infrared fluorescent members, the scattered-light emitting unit 21 may include fluorescent substances that emit ultraviolet light (ultraviolet fluorescent substances). Examples of ultraviolet fluorescent substances include an upconversion material and a two photon absorption material. Particularly, when the scattered-light emitting unit $21f$ includes ultraviolet fluorescent substances, advantages similar to those obtained in the case where the scattered-light emitting unit $21f$ includes infrared fluorescent members can be obtained.

The scattered-light emitting units $21a$ to $21e$ may include any of selective fluorescent substances having wavelengths that are not susceptible to fluorescence emitted from the light emitting units 4 and do not necessarily have to include infrared fluorescent members or ultraviolet fluorescent substances as in the case of the scattered-light emitting unit $21f$.

The scattered-light emitting units 21 may emit scattered light by causing diffused reflection of laser beams without changing the wavelength of the laser beams. In this case, ground glass, glass having irregularities on the surface or inside of it, frosted glass, and figured glass may be used as examples of the scattered-light emitting unit 21. The size of the irregularities here may be on the order of 1 nm to 100 μm. The scattered-light emitting unit 21 may include particles of the size on the order of 1 nm to 100 μm (alumina particles, for example) in the glass so as to emit scattered light by causing diffused reflection of laser beams.

When the scattered-light emitting unit 21 includes ultraviolet fluorescent substances or any of various types of glass, the following components are used as examples: photosensors 8 that can detect ultraviolet light or light having a wavelength equal to (or close to) the wavelength of laser beams, a transmission filter 10 that transmits these types of light, and a light-blocking filter 9 and a housing that prevent these types of light from entering the detectable ranges as outdoor light.

As described above, the headlamp 1 includes scattered-light emitting units 21 disposed along the predetermined path formed by a laser beam so as to be adjacent to the predetermined path as in the cases of the components (1) to (4) and the scattered-light emitting unit 21 disposed adjacent to the predetermined irradiation region formed by the laser beam as in the case of the component (5).

The case of the component (1) (the case where optical members are disposed at some portions on the predetermined path) is described as an example referring to part (a) of FIG. 8. When the headlamp 1 operates normally, the headlamp 1 can be used in a securely safe state since the entirety of a laser beam is transmitted through the condensing lens 11. On the other hand, when the headlamp 1 operates abnormally due to a failure or other causes, a laser beam is deviated from the predetermined path and emitted from the scattered-light emitting unit 21a as scattered light. The condensing lens 11 is omitted in part (a) of FIG. 8.

The case of the component (5) (the case where a light emitting unit is positioned in the predetermined irradiation region) is similar to the above case of the component (1) and described referring to part (b) of FIG. 8. When the headlamp 1 operates normally, the entirety of a laser beam is converted into fluorescence (illumination light) by the light emitting unit 4. On the other hand, when the headlamp 1 operates abnormally, a laser beam is deviated from the predetermined irradiation region and emitted from the scattered-light emitting unit 21f as scattered light.

As described above, the headlamp 1 converts laser beams into scattered light when the laser beams are deviated from the predetermined path or irradiation region, whereby the degree of danger in using laser beams can be reduced and the safety of the human body can thus be improved. The headlamp 1 thus may emit scattered light outwards. When the headlamp 1 is designed so as to be capable of emitting scattered light outwards, users can visually identify the scattered light and recognize that laser beams are deviated from the predetermined path or irradiation region (the headlamp 1 is in the abnormal operation state).

In addition, the detection of scattered light using the photosensor 8 enables immediate determination of a deviation of a laser beam from the predetermined path or irradiation region, whereby emission of laser beams can be immediately stopped. Consequently, a reliably safe headlamp can be provided since the headlamp 1 can be instantaneously turned off immediately after it enters into the abnormal operation state. Here, users can quickly recognize a failure of the headlamp 1 by visually identifying the turning off or the scattered light.

In addition, since a laser beam deviated from the predetermined path or irradiation region is converted into scattered light, the situation where a portion of the headlamp 1 irradiated with a laser beam is heated and thus damaged can be avoided.

When the scattered-light emitting units 21 are formed of ground glass or the like, detecting members that replace the photosensors 8 may detect a change in amount of white light emitted from the light emitting unit 4 or a change in amount of laser beams emitted from optical members such as condensing lenses 11. Even in this case, a deviation of a laser beam that occurs at the time of a failure can be detected.

(Stop Instruction Unit 22)

The stop instruction unit 22 instructs the laser devices 2 to stop emitting laser beams when the photosensors 8 detect scattered light emitted from the scattered-light emitting units 21a to 21f, that is, upon receipt of detection confirmation signals from the photosensors 8. For example, an emergency brake circuit (not illustrated) is connected to the laser devices 2. The emergency brake circuit stops supplying power to the laser devices 2 when scattered light is detected. The stop instruction unit 22 operates the emergency brake circuit to stop laser beam emission.

Figure 9:
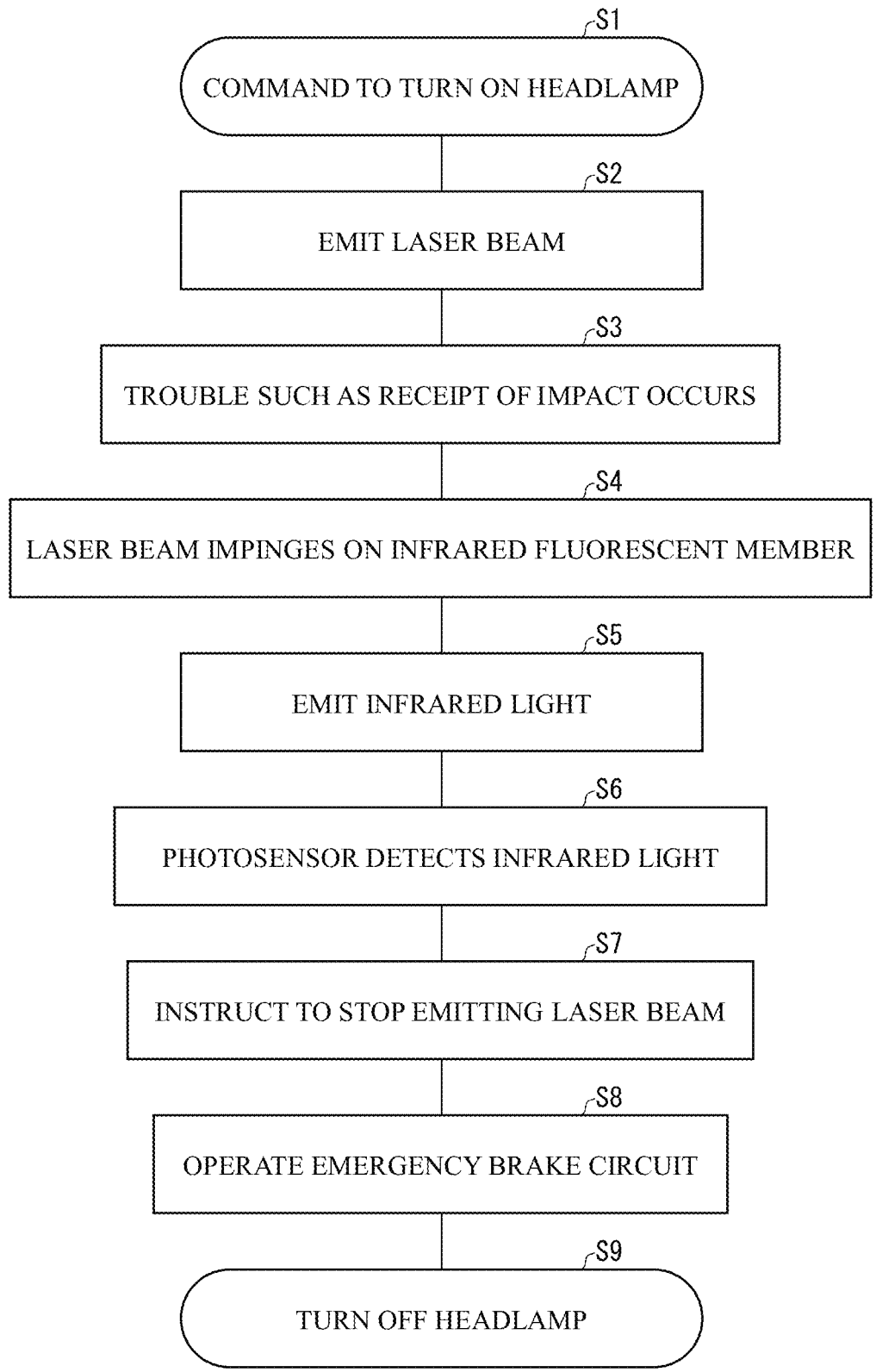
FIG. 9 is a flow chart illustrating an example of processing performed by the headlamp in an unusual operation state.

Referring now to FIG. 9, an example of an operation performed by the headlamp 1 when the headlamp 1 enters into the abnormal operation state will be described.

Firstly, when a user issues a command to turn on the headlamp 1 (S1), the laser devices 2 emit laser beams (S2). Thus, the laser beams emitted from the laser devices 2 are converted into fluorescence by the light emitting unit 4 and the headlamp 1 emits the fluorescence as illumination light.

Subsequently, when a laser beam is deviated from the predetermined path or irradiation region due to an occurrence of a trouble such as receipt of impact (S3), the laser beam impinges on a scattered-light emitting unit 21 (infrared fluorescent member) (S4). When the scattered-light emitting unit 21 converts the laser beam into infrared light and emits the infrared light (S5), a photosensor 8 detects the infrared light entering its detectable range (S6). The photosensor 8 instructs the laser devices 2 to stop emitting laser beams (S7). Specifically, the photosensor 8 transmits a detection confirmation signal to the emergency brake circuit to operate the circuit (S8), so that emission of laser beams from the laser devices 2 is stopped. As a result, the headlamp 1 is turned off (S9).

In this manner, when a laser beam is deviated from the predetermined path or irradiation region in case of a failure of the headlamp 1 or in other cases, the laser beam can be securely prevented from leaking out of the headlamp 1. Thus, the safety of the human body is improved and reliably secured.

(Comparison with Parabola Reflector)

Figure 10:
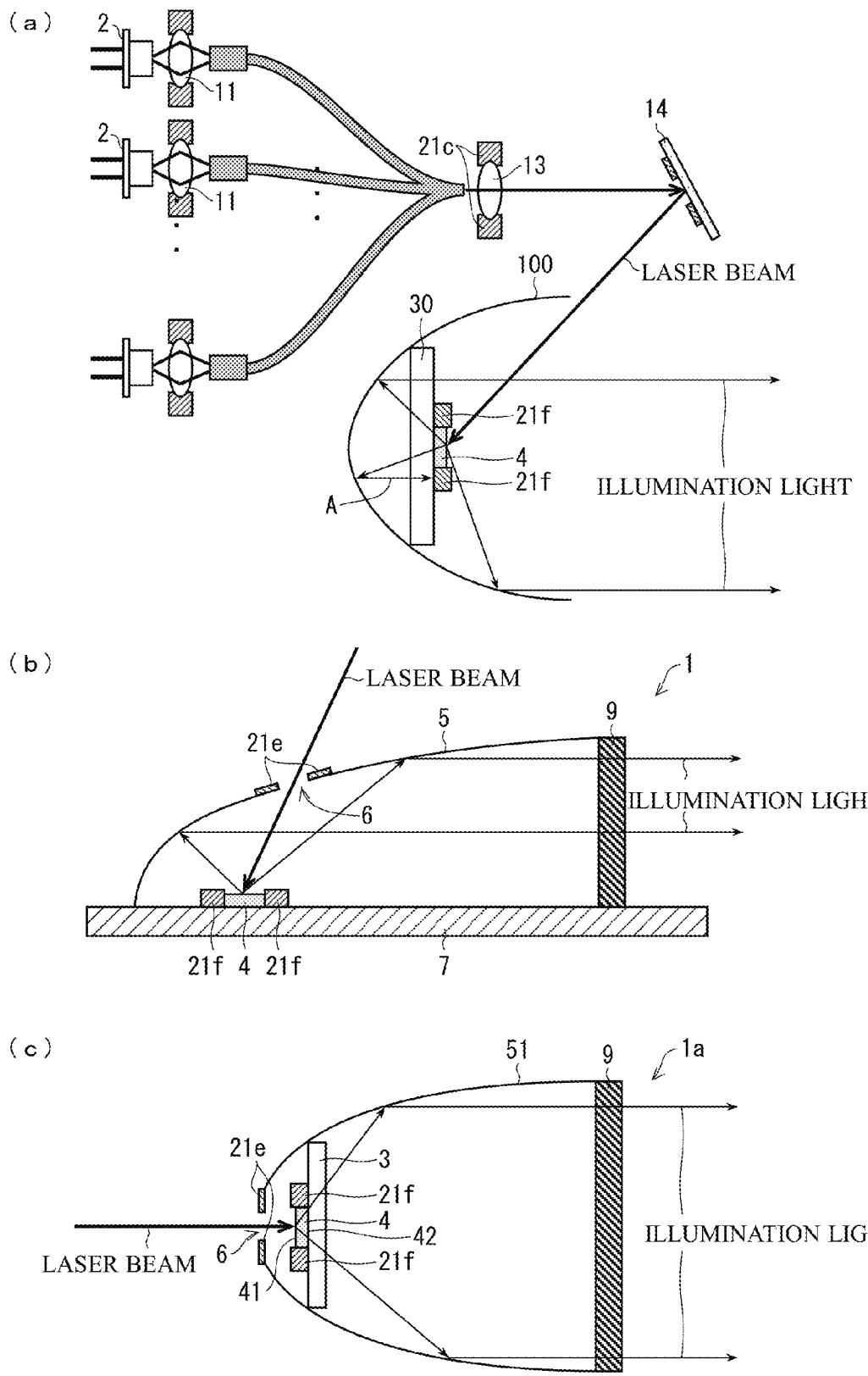
FIG. 10 illustrates examples of directions in which fluorescence (illumination light) emitted from the light emitting unit travels, where part (a) illustrates, in a cross section, a schematic configuration of a headlamp including a parabola reflector in which a scattered-light emitting unit is disposed around the light emitting unit, part (b) illustrates a schematic configuration of the headlamp illustrated in FIG. 1 in a cross section, and part (c) illustrates a schematic configuration of the headlamp illustrated in FIG. 13 in a cross section.

Part (a) of FIG. 10 illustrates, in a cross section, a schematic configuration of a headlamp including a parabola reflector 100 in which a scattered-light emitting unit 21f is disposed around a light emitting unit 4. Here, the light emitting unit 4 and the scattered-light emitting unit 21f are bonded (applied) to a transparent plate 30 made of a material such as glass and having a substantially circular shape. The transparent plate 30 is in contact with the inner side of the parabola reflector 100 such that the light emitting unit 4 is disposed at the focus position of the parabola reflector 100. In this headlamp, a laser beam reflected off a reflection mirror 14 enters from an opening of the parabola reflector 100 and impinges on a light receiving surface 41 of the light emitting unit 4.

In this configuration, fluorescence emitted from the light emitting unit 4 is emitted also in a direction (to the tip side of the parabola reflector 100) opposite to the direction in which the headlamp emits illumination light (to the opening side of the parabola reflector 100). The fluorescence emitted to the tip side is reflected by the parabola reflector 100 and then arrives at the scattered-light emitting unit 21f (as indicated by the arrow A in part (a) of FIG. 10). In other words, in the case of the parabola reflector 100, the optical path of the fluorescence emitted from the light emitting unit 4 may be blocked by the scattered-light emitting unit 21f without the fluorescence not being emitted from the opening of the parabola reflector 100 as illumination light.

On the other hand, in this embodiment, as illustrated in part (b) of FIG. 10, in the headlamp 1 including the half parabola reflector 5, the light emitting unit 4 is disposed on the metal base 7 even when the light emitting unit 4 is positioned at the focusing position of the half parabola reflector 5. Thus, the optical path of fluorescence emitted from the light emitting unit 4 is not blocked by the scattered-light emitting unit 21f. Consequently, the efficiency of fluorescence use can be increased further than in the case where the scattered-light emitting unit 21f is installed in the parabola reflector 100.

(Modification as to Position at which Photosensor 8 is Installed)

Figure 11:
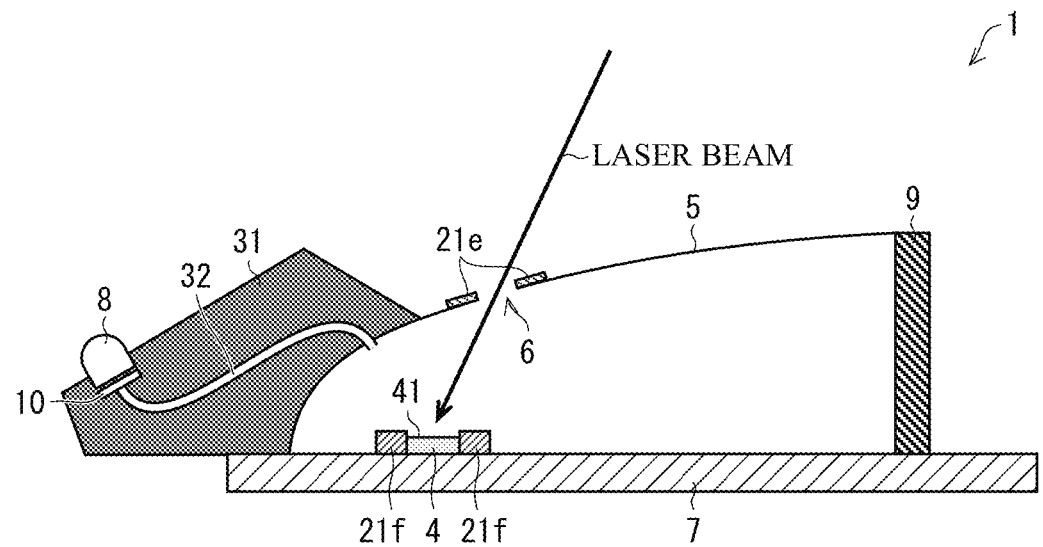
FIG. 11 illustrates a schematic configuration of a headlamp in a cross section when a photosensor is disposed outside the half parabola reflector.
Figure 12:
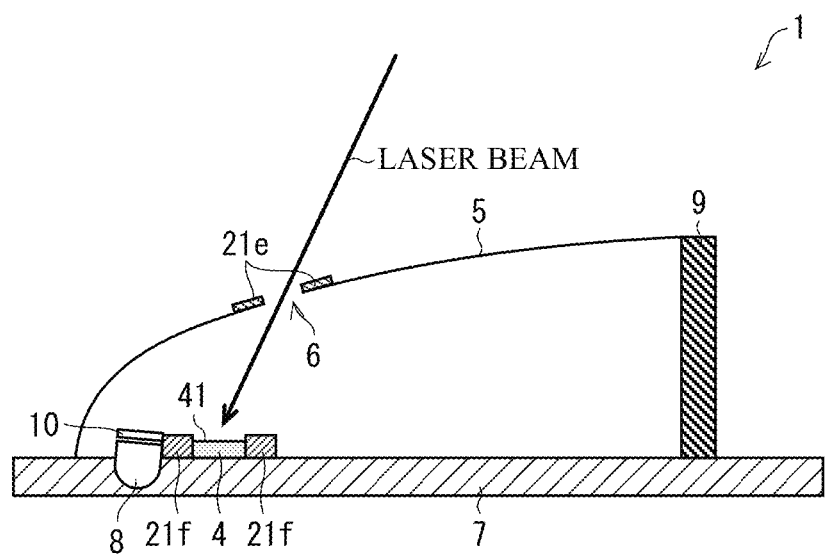
FIG. 12 illustrates a schematic configuration of a headlamp in a cross section when a photosensor is disposed inside the half parabola reflector.

Referring now to FIG. 11 and FIG. 12, a modification is described in which the position at which the photosensor 8, which detects scattered light emitted from the scattered-light emitting unit 21f, is installed. FIG. 11 illustrates a schematic configuration of a headlamp 1 in a cross section when a photosensor 8 is disposed outside the half parabola reflector 5. FIG. 12 illustrates a schematic configuration of a headlamp 1 in a cross section when a photosensor 8 is disposed inside the half parabola reflector 5.

In FIG. 11, a hole is formed in a range within which scattered light emitted from the scattered-light emitting unit 21f is detectable and the incident end portion of an optical fiber 32 is inserted into the hole. In addition, the emergence end portion of the optical fiber 32 is disposed so as to face the laser-beam incident surface of the photosensor 8 with a transmission filter 10 interposed therebetween. In addition, a housing 31 (outdoor-light blocking means) that prevents light (for example, outdoor light) having a wavelength equal to or close to the wavelength of scattered light from entering a region in which the photosensor 8 and the optical fiber 32 are optically connected to each other is provided. Providing the housing 31 in this manner can prevent the photosensor 8 from malfunctioning due to such light. In FIG. 11, the housing 31 is bonded to the half parabola reflector 5 and surrounds the entire optical fiber 32 and the laser-beam incident surface of the photosensor 8, but the housing is not limited to this example. The housing may only surround at least the above-described connection region (detectable range of the photosensor 8).

The optical fiber 32 has the same size and shape as the optical fiber 12 and the core diameter is 125 μm. On the other hand, the diameter of the scattered-light incident surface of the photosensor 8 is approximately 4.7 mm. Thus, as illustrated in FIG. 11, the hole into which the optical fiber 32 is inserted in order for the photosensor 8 to detect scattered light through the optical fiber 32 can be made smaller than the hole formed in the case where the photosensor 8 is directly mounted on the half parabola reflector 5 as in the case of FIG. 1. Thus, the smaller opening has a smaller reduction effect on the efficiency with which the half parabola reflector 5 reflects fluorescence.

In FIG. 12, the photosensor 8 is installed in a hole formed in the metal base 7 on the tip side of the half parabola reflector 5 with respect to the light emitting unit 4. The photosensor 8 is disposed adjacent to the scattered-light emitting unit 21f. In this disposition, the photosensor 8 is not disposed on the optical path formed by fluorescence emitted from the light emitting unit 4 to the half parabola reflector 5 and thus the fluorescence is not emitted to the photosensor 8. In other words, by disposing the photosensor 8 at a position at which the photosensor 8 does not affect the amount of illumination light output of the headlamp 1, the efficiency with which the half parabola reflector 5 reflects fluorescence can be prevented from being reduced as in the case of FIG. 11.

(Range of Use of Laser-Beam Utilization Device)

As described above, a laser-beam utilization device is basically formed of the scattered-light emitting units 21.

For example, the scattered-light emitting units 21a to 21f are disposed adjacent to the above-described components (1) to (5) as illustrated in FIG. 3 to FIG. 7. Likewise, a laser-beam utilization device according to an embodiment of the present invention can be formed not only in the headlamp 1 but also in an optical member that includes the scattered-light emitting unit 21, such as a lens, an optical fiber, a reflection mirror, a reflector, or a light emitting unit as illustrated in the components (1) to (5). In other words, a laser-beam utilization device according to an embodiment of the present invention is not limited to be included in the illuminating device and may be included in an emission device that emits laser beams along a predetermined path or may be included in an irradiation device that irradiates a predetermined irradiation region with laser beams.

When the configuration of the laser-beam utilization device basically includes the scattered-light emitting units 21, the photosensors 8, and the stop instruction unit 22, the photosensors 8 are respectively disposed on the scattered-light emitting units 21a to 21f. The photosensors 8 are connected to the stop instruction unit 22 so as to be able to transmit results of scattered light detection to the stop instruction unit 22. Also in this basic configuration, a laser-beam utilization device according to an embodiment of the present invention can be included in the above-described optical member.

A laser-beam utilization device according to an embodiment of the present invention does not necessarily have to include a laser device. The laser-beam utilization device only has to have such a configuration that laser beams that enter from the outside the laser-beam utilization device can form a predetermined path or irradiation region by being transmitted through the above-described optical members of the laser-beam utilization device or being reflected by the above-described optical members.

Second Embodiment

Figure 13:
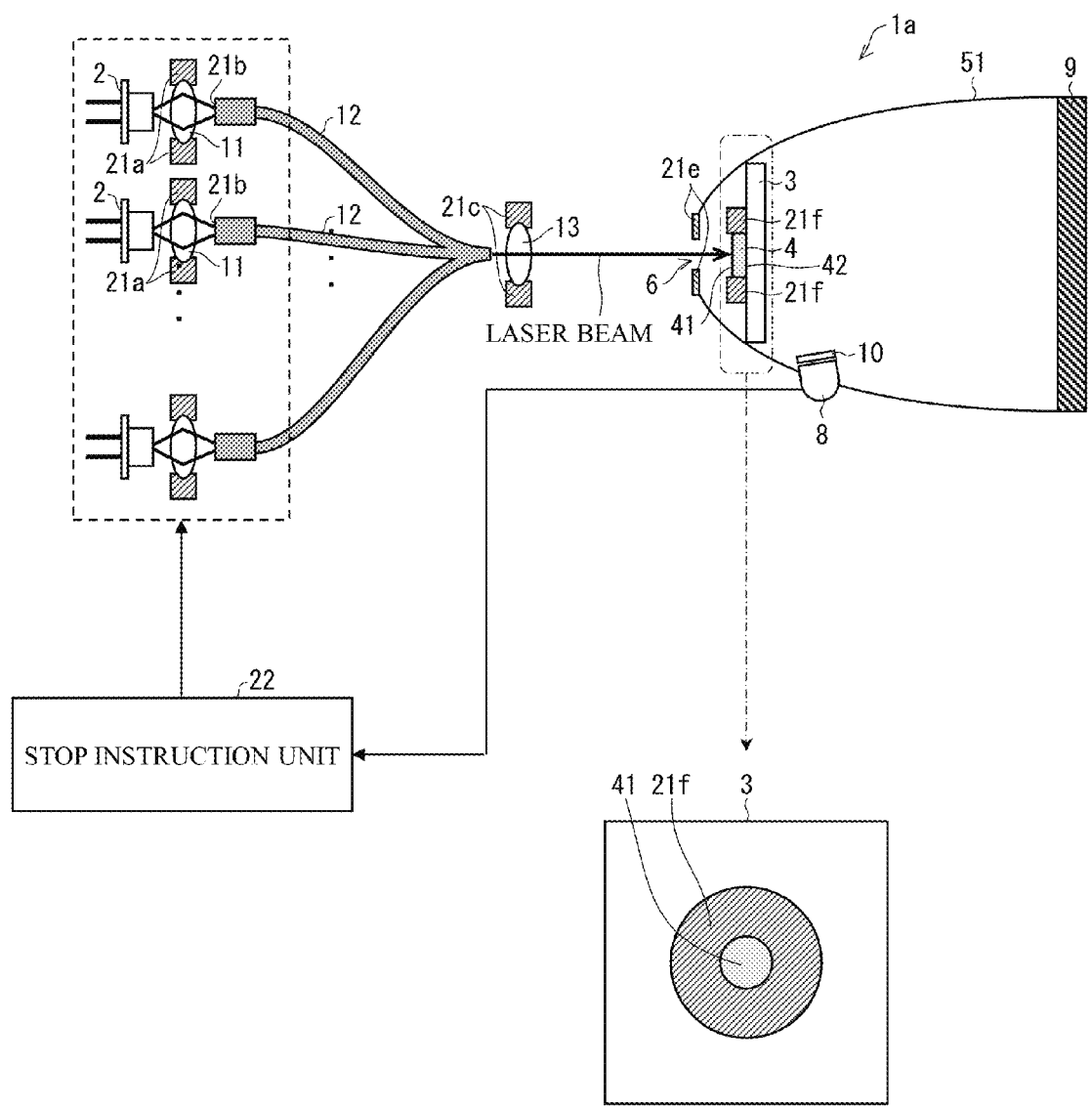
FIG. 13 illustrates a schematic configuration of a headlamp according to another embodiment of the present invention.

Referring to FIG. 10 and FIG. 13, another embodiment of the present invention will be described below. Components that are the same as those in the first embodiment will be denoted by the same reference symbols and description of those is omitted. FIG. 13 is a schematic configuration of a headlamp 1a including an ellipsoid reflector 51.

(Ellipsoid Reflector 51)

As in the case of the half parabola reflector 5, the ellipsoid reflector 51 reflects fluorescence produced by the light emitting unit 4 so as to form a bundle of rays (illumination light) that travels within a predetermined solid angle. A window portion 6 is formed near the tip of the ellipsoid reflector 51. Laser beams that have been transmitted through a lens 13 enter the inside of the ellipsoid reflector 51 from the window portion 6. In other words, in the headlamp 1a, laser beams are directly led to the inside of the ellipsoid reflector 51 without using the reflection mirror 14 as in the case of the first embodiment.

(Heat Conductive Member 3)

A heat conductive member 3 is disposed on the surface of the light emitting unit 4 opposite to the light receiving surface 41 (that is, on the fluorescence emergence surface 42). The heat conductive member 3 is a member that can receive heat from the light emitting unit 4 and that can transmit light therethrough. The heat conductive member 8 is thermally connected to the light emitting unit 4 (that is, connected so as to be capable of interchanging heat energy with the light emitting unit 4). The heat conductive member 3 is in contact with the inner side of the ellipsoid reflector 51 and has a substantially elliptic shape. The heat conductive member 3 may be disposed on the light receiving surface 41. Still alternatively, a transparent plate 30 may be provided instead of the heat conductive member 3 when dissipation of heat produced by the light emitting unit 4 is disregarded.

(Light Emitting Unit 4 and Scattered-Light Emitting Unit 21f)

The light emitting unit 4 receives laser beams on its light receiving surface 41, converts the laser beams therein into fluorescence, and emits the fluorescence from the fluorescence emergence surface 42. In other words, the light emitting unit 4 according to the second embodiment is a transmissive light emitting unit that emits fluorescence from the fluorescence emergence surface 42, which is a surface opposite to the laser-beam incident surface (light receiving surface 41). In addition, the light emitting unit 4 is bonded to the heat conductive member 3 so as to be disposed at the focusing position of the ellipsoid reflector 51. The scattered-light emitting unit 21f is bonded to the heat conductive member 3 around the light emitting unit 4.

Also in this configuration, the photosensor 8 detects a laser beam when the laser beam is deviated from the predetermined path or irradiation region and the stop instruction unit 22 causes the laser devices 2 to stop emitting laser beams. In other words, as in the case of the headlamp 1, this configuration can prevent laser beams from leaking out of the headlamp 1a. Thus, the safety of the human body can be improved.

(Comparison with Parabola Reflector)

In the headlamp 1a, as illustrated in part (c) of FIG. 10, even though the light emitting unit 4 is disposed at the focusing point, the optical path of fluorescence emitted from the light emitting unit 4 is not blocked by the scattered-light emitting unit 21f since the fluorescence is emitted from the fluorescence emergence surface 42 opposite to the light receiving surface 41 that receives laser beams. Consequently, as in the case of the first embodiment, the efficiency of fluorescence use can be increased further than in the case where the scattered-light emitting unit 21f is installed in the parabola reflector 100 as illustrated in part (a) of FIG. 10.

Other Embodiments of the Invention

The present invention can also be embodied in the following manners.

Specifically, in a laser-beam utilization device according to an embodiment of the present invention, the scattered-light emitting units should preferably be disposed adjacent to the predetermined path or irradiation region.

In this configuration, since the scattered-light emitting units are disposed adjacent to the predetermined path or irradiation region, the scattered-light emitting units can emit scattered light even when a laser beam is deviated from the predetermined path or irradiation region by a small distance.

Furthermore, a laser-beam utilization device according to an embodiment of the present invention should preferably include a light source that emits laser beams and a light emitting unit that is disposed in the predetermined irradiation region and emits fluorescence upon receipt of the laser beam emitted from the light source.

In this configuration, fluorescence can be emitted as illumination light. Thus, the laser-beam utilization device can be used as a light source of light having an appropriate wavelength.

Furthermore, in a laser-beam utilization device according to an embodiment of the present invention, the scattered-light emitting unit should preferably receive a laser beam deviated from the predetermined path at a portion of the predetermined path.

In this configuration, a laser beam deviated from the predetermined path at a portion of the predetermined path can be reliably received. Thus, scattered light can be reliably emitted when a laser beam is deviated.

Furthermore, in a laser-beam utilization device according to an embodiment of the present invention, it is preferable to provide detection means for detecting scattered light emitted by the scattered-light emitting unit.

In this configuration, when a laser beam is deviated from the predetermined path or irradiation region, scattered light emitted by the scattered-light emitting unit can be detected inside the laser-beam utilization device. Thus, an operation for guaranteeing the safety of the human body, such as an operation of stopping emission of a laser beam on the basis of the detection result (or issuing a command to perform the operation), can be performed.

Furthermore, in a laser-beam utilization device according to an embodiment of the present invention, it is preferable to provide stop instruction means for instructing a light source that emits laser beams to stop emitting laser beams when the detection means has detected the scattered light.

In this configuration, when a laser beam is deviated from the predetermined path or irradiation region, the detection means can detect scattered light and the stop instruction means can cause the light source to stop emitting laser beams. As a result, laser beams can be prevented from leaking out of the laser-beam utilization device, thereby improving the safety of the human body.

Furthermore, in a laser-beam utilization device according to an embodiment of the present invention, a light transmitting member disposed at a position on the predetermined path so as to be adjacent to the scattered-light emitting unit should preferably have a laser-beam transmissivity of 90% or higher or a light reflecting member disposed at a position on the predetermined path so as to be adjacent to the scattered-light emitting unit should preferably have a laser-beam reflectivity of 90% or higher.

In this configuration, laser beams can efficiently form the predetermined path.

Furthermore, in a laser-beam utilization device according to an embodiment of the present invention, the scattered-light emitting unit should preferably emit fluorescence having a predetermined wavelength as the scattered light.

In this configuration, laser beams are converted into fluorescence having a predetermined wavelength and the fluorescence is emitted, whereby the degree of danger in using laser beams can be reduced.

Furthermore, in a laser-beam utilization device according to an embodiment of the present invention, the scattered-light emitting unit should preferably emit fluorescence having a predetermined wavelength as the scattered light and it is preferable to provide outdoor-light blocking means for preventing outdoor light having a wavelength equal to or close to the predetermined wavelength from entering a detectable range of the detection means.

In this configuration, laser beams are converted into fluorescence having a predetermined wavelength and the fluorescence is emitted, whereby the degree of danger in using laser beams can be reduced. In addition, this configuration can prevent the detection means from malfunctioning due to an entrance of outdoor light having a wavelength equal to or close to the predetermined wavelength.

Furthermore, in a laser-beam utilization device according to an embodiment of the present invention, scattered light emitted by the scattered-light emitting unit should preferably have a wavelength different from a wavelength of fluorescence emitted by the light emitting unit.

In this configuration, since the wavelength of scattered light emitted by the scattered-light emitting unit is different from the wavelength of fluorescence emitted by the light emitting unit, a deviation of a laser beam can be easily detected.

Furthermore, a vehicle headlight according to an embodiment of the present invention should preferably include the above-described laser-beam utilization device.

As in the case of the laser-beam utilization device, use of this configuration can make a vehicle headlight that can reduce the degree of danger in using laser beams even when laser beams are deviated from the predetermined path or irradiation region.

The present invention is not limited to the above-described embodiments and may be modified in various manners within the scope of appended claims. Specifically, embodiments formed by combining any of technical means appropriately modified within the scope of appended claims are included in the technical scope of the present invention.

INDUSTRIAL APPLICABILITY

According to the present invention, the degree of danger in using laser beams can be reduced and the safety of the human body can be improved. Thus, the present invention is suitable for a device utilizing laser beams, that is, suitable for not only illuminating devices such as a headlamp or a downlight but also for optical components such as optical fibers or lenses that transmit laser beams and a reflection mirror that reflects laser beams.

REFERENCE SIGNS LIST 1, 1a headlamp (laser-beam utilization device, vehicle headlight)
2 laser device (light source)
4 light emitting unit (predetermined irradiation region)
6 window portion (at a portion of a predetermined path)
8 photosensor (detection means)
9 light-blocking filter (outdoor-light blocking means)
11 condensing lens (light transmitting member, at a portion of a predetermined path)
12 optical fiber (light transmitting member, at a portion of a predetermined path)
13 lens (light transmitting member, at a portion of a predetermined path)
14 reflection mirror (light reflecting member, at a portion of a predetermined path)
21, 21a to 21f scattered-light emitting unit
22 stop instruction unit (stop instruction means)
31 housing (outdoor-light blocking means)
41 light receiving surface (predetermined irradiation region)

The invention claimed is:

1. A laser-beam utilization device that utilizes a laser beam, the device comprising:
a scattered-light emitting unit that emits scattered light upon receipt of a laser beam deviated from a predetermined path through which the laser beam is to pass or a predetermined irradiation region that is to be irradiated by the laser beam;
a light source that emits the laser beam; and
a light emitting unit that is disposed in the predetermined irradiation region and that emits fluorescence upon receipt of the laser beam emitted from the light source.

2. A laser-beam utilization device that utilizes a laser beam, the device comprising:
a scattered-light emitting unit that emits scattered light upon receipt of a laser beam deviated from a predetermined path through which the laser beam is to pass or a predetermined irradiation region that is to be irradiated by the laser beam; and
a detector for detecting the scattered light emitted from the scattered-light emitting unit.

3. The laser-beam utilization device according to claim 2, further comprising a stop instruction controller for instructing the light source, which emits the laser beam, to stop emitting the laser beam when the detector has detected the scattered light.

4. A laser-beam utilization device that utilizes a laser beam, the device comprising:
a scattered-light emitting unit that emits scattered light upon receipt of a laser beam deviated from a predetermined path through which the laser beam is to pass or a predetermined irradiation region that is to be irradiated by the laser beam,
wherein the scattered-light emitting unit emits fluorescence having a predetermined wavelength as the scattered light.

5. The laser-beam utilization device according to claim 2,
wherein the scattered-light emitting unit emits fluorescence having a predetermined wavelength as the scattered light, and
wherein the device further comprises an outdoor-light blocking filter for preventing outdoor light having a wavelength equal to or close to the predetermined wavelength from entering a detectable range of the detector.

6. The laser-beam utilization device according to claim 1, wherein the scattered light emitted from the scattered-light emitting unit has a wavelength different from a wavelength of the fluorescence emitted by the light emitting unit.

7. A vehicle headlight comprising the laser-beam utilization device according to claim 1.

8. A vehicle headlight comprising the laser-beam utilization device according to claim 2.

9. A vehicle headlight comprising the laser-beam utilization device according to claim 3.

10. A vehicle headlight comprising the laser-beam utilization device according to claim 4.

11. A vehicle headlight comprising the laser-beam utilization device according to claim 5.

12. A vehicle headlight comprising the laser-beam utilization device according to claim 6.

* * * * *